United States Patent
Kimura

[11] Patent Number: 5,916,948
[45] Date of Patent: Jun. 29, 1999

[54] AQUEOUS RESIN COMPOSITION, PRODUCTION METHOD THEREFOR, AND AQUEOUS COATING

[75] Inventor: Shuji Kimura, Kitakatsushika-gun, Japan

[73] Assignee: Fujikura Kasei Co., Ltd., Tokyo, Japan

[21] Appl. No.: 08/815,203

[22] Filed: Mar. 12, 1997

[30] Foreign Application Priority Data

Mar. 27, 1996 [JP] Japan .................................. 8-095864
Jan. 30, 1997 [JP] Japan .................................. 9-017148

[51] Int. Cl.⁶ .................................................. C08F 2/16
[52] U.S. Cl. ........................................ 524/458; 525/243
[58] Field of Search ............................. 524/458; 525/243

[56] References Cited

U.S. PATENT DOCUMENTS 5,349,022  9/1994  Ashihara et al. ....................... 524/414

FOREIGN PATENT DOCUMENTS 5-59188    3/1993  Japan .
5-209006   8/1993  Japan .
7-300570  11/1995  Japan .

*Primary Examiner*—Melvyn I. Marquis
*Assistant Examiner*—D. Aylward
*Attorney, Agent, or Firm*—Pearne, Gordon, McCoy & Granger LLP

[57] ABSTRACT

An aqueous coating composition using an aqueous resin composition which is a polymer obtained by causing the chlorinated polyolefin resin particles in an aqueous dispersion fluid dispersively containing chlorinated polyolefin resin particles at a chlorination of 10–50% by weight by means of polymerizable monomers, then polymerizing these polymerizable monomers, wherein the ratio of chlorinated polyolefin resin particles/polymerizable monomers is 5–50% by weight/95–50% by weight. This aqueous coating composition is exceptional with regard to adhesion to polyolefin base materials, smoothness and uniformity of the coating film, and storage stability as a coating composition.

11 Claims, No Drawings

AQUEOUS RESIN COMPOSITION, PRODUCTION METHOD THEREFOR, AND AQUEOUS COATING

BACKGROUND OF THE INVENTION

1. Field of the Invention

The present invention relates to aqueous resin compositions which are effective binders for aqueous coatings, production methods therefor, and aqueous coatings using these aqueous resin compositions. More specifically, the present invention relates to aqueous resins which have excellent adhesion with respect to polyolefin resins such as polyethylene, polypropylene, ethylene-propylene copolymers, and ethylene-propylene-diene copolymers, which are effective as binders for aqueous resins which can form films with excellent film properties such as weather resistance and water resistance, production methods therefor, and aqueous coatings using these aqueous resin compositions.

2. Description of the Related Art

Conventionally, coatings for molded articles, sheets, films and the like which have polyolefin resins as the base materials are usually formed by blending various resins to chlorinated polyolefins or by denaturing chlorinated polyolefins with various resins and using these as the coating binders. However, since these chlorinated polyolefin type resins dissolve only in organic solvents such as toluene, xylene and the like, the resulting coatings contain large amounts of organic solvents and are known as organic solvent type coatings which have many problems in terms of health, environmental contamination, and hazardousness.

Therefore, in order to improve on the above-mentioned problems of organic solvent type coatings, the study of polyolefin resin coatings which do not include organic solvents has been advanced. In one example, chlorinated polyolefin resins are dispersed in water and emulsified for use as a coating binder, but these chlorinated polyolefin resin emulsions have poor adhesion to polyolefin resins, are difficult to disperse in water in microparticulate form, and have a complicated production process. Hence, these have not yet been put into actual practice.

As a specific example, Japanese Patent Application, First Publication No. 5-59188 proposes a method wherein chlorinated polyolefin resins are dissolved into an organic solvent and this solution is forcedly dispersed into an aqueous medium, after which the solvent is removed to obtain an aqueous compound. However, with this method, the viscosity of the chlorinated polyolefin resin solution itself makes it difficult to disperse in an aqueous medium in microparticulate form, and the surface smoothness of the resulting coating film is poor due to insufficient long-term stability of the dispersion fluid itself. Hence, while it can be used as an undercoated coating such as a primer, a base coat or a sealer, it is not suitable as a top-coated coating, and it also raises costs due to the need for steps of dissolving the chlorinated polyolefin resins and removing the solvent.

Additionally, Japanese Patent Application, First Publication No. 5-209006 proposes a method wherein chlorinated polyolefin resins are dissolved into an acrylic monomer and this solution is forcedly dispersed into an aqueous medium, after which a polymerization process is applied to obtain an aqueous compound. However, as with the above method, this method involves dispersing a chlorinated polyolefin resin into a solution, making microparticulate dispersion into water difficult. Additionally, chlorinated polyolefin resins are such that as the degree of chlorination decreases, their compatibility with acrylic monomers generally decreases and their compatibility with acrylic monomers produced by polymerization also decreases, so that the chlorinated polyolefin resins and acrylic monomers separate inside droplets dispersed within the aqueous medium. In some cases, the acrylic monomers separate into layers during the polymerization process and cover the surfaces of the produced particles, so that the adhesion to polyolefin resins decreases dramatically and the state of mixture between the chlorinated polyolefin resins and the acrylic monomers within each particle become nonuniform so as not to allow for sufficient denaturing effects from the acrylic monomers.

Recently, the need for coatings which are capable of being coated onto non-surface-treated polyolefin resin base materials in a single coat has increased due to the consideration of recycling of plastics and the prevention of ozone depletion. Consequently, polyolefin resins with very low chlorinations of 25% and under have garnered interest as coating binders, but these low-chlorination polyolefin resins are difficult to dissolve in (meth)acrylic monomers. Therefore, it is very hard to obtain aqueous compounds using the method of Japanese Patent Application, First Publication No. 5-209006.

Furthermore, Japanese Patent Application, First Publication No. 7-300570 proposes a method wherein chlorinated polyolefin resins are dissolved in an organic solvent with a solubility of 18.5% or less with respect to water, forcedly dispersed in an aqueous medium, emulsified, then added to an acrylic monomer pre-emulsion and finally polymerized to obtain an aqueous compound. However, since highly chlorinated polyolefin resins having chlorinations of 50–71% are used in this method, adhesion to the polyolefin resin base material absolutely fails to occur, and the method can only be applied to special uses for concrete base materials. Additionally, the particles of the acrylic monomer pre-emulsion often do not sufficiently mix uniformly with the particles of the chlorinated polyolefin resin emulsion and instead form separate polymers, so that the resulting resin composition is nothing more than a simple blend between the chlorinated polyolefin resin emulsion and the acrylic monomer emulsion. Consequently, the adhesion to the polyolefin resins further decreases while the denaturing effect due to the acrylic polymers is not very significant, and when a coating is formed by mixing with another type of emulsion, the stability in storage is worsened.

SUMMARY OF THE INVENTION

The present invention has the object of offering a resin composition which is useful as a binder for aqueous coating compositions, a coating composition using this resin composition, and a method for easily obtaining such an aqueous resin composition without the need for complicated steps, the aqueous resin composition being such as to resolve the problems of aqueous coating compositions using chlorinated polyolefin resins which have conventionally been proposed, i.e. the problem that it is difficult to form a coating film surface with excellent smoothness such as is required of coating compositions for top-coats and it is difficult for denaturation effects of the chlorinated polyolefin resin to arise because of the difficulty of dispersing chlorinated polyolefin resins into aqueous media in microparticulate form.

The aqueous resin composition according to the present invention comprises a polymer obtained by causing chlorinated polyolefin resin particles dispersed in an aqueous dispersion fluid with a chlorination of 10–50% by weight to swell by means of polymerizable monomers, then polymerizing the polymerizable monomers; wherein the ratio of the chlorinated polyolefin resin particles to the polymerizable monomers is 5–50% by weight to 95–50% by weight; or comprises a polymer obtained by causing chlorinated polyolefin resin particles dispersed in an aqueous dispersion fluid with a chlorination of 10–50% by weight to swell by means of first polymerizable monomers, then polymerizing the first polymerizable monomers to form denatured resin particles, and further causing the denatured resin particles to swell by means of second polymerizable monomers, then polymerizing the second polymerizable monomers; wherein the ratio of the chlorinated polyolefin resin particles to the first and second polymerizable monomers is 5–50% by weight to 95–50% by weight.

Additionally, the method for producing an aqueous resin composition according to the present invention comprises a swelling step wherein chlorinated polyolefin resin particles are caused to swell with polymerizable monomers by adding polymerizable monomers capable of causing the chlorinated polyolefin resins to swell to an aqueous dispersion fluid containing dispersed chlorinated polyolefin resin particles with a chlorination of 10–50% by weight, such that the ratio of the chlorinated polyolefin resin particles to the polymerizable monomers is 5–50% by weight to 95–50% by weight; and a polymerizing step wherein the polymerizable monomers absorbed into the chlorinated polyolefin resin particles are polymerized; or comprises a first swelling step wherein chlorinated polyolefin resin particles are caused to swell with first polymerizable monomers by adding first polymerizable monomers capable of causing the chlorinated polyolefin resins to swell to an aqueous dispersion fluid containing dispersed chlorinated polyolefin resin particles with a chlorination of 10–50% by weight; a first polymerizing step wherein the first polymerizable monomers absorbed into the chlorinated polyolefin resin particles are polymerized to obtain denatured resin particles; a second swelling step wherein the denatured resin particles are caused to swell with second polymerizable monomers by adding second polymerizable monomers capable of causing the denatured resin particles to swell are added such that the ratio of the chlorinated polyolefin resin particles to the first and second polymerizable monomers is 5–50% by weight to 95–50% by weight; and a second polymerizing step wherein the polymerizable monomers absorbed into the denatured resin particles are polymerized.

The chlorination of the chlorinated polyolefin resin articles can be made 15–25% by weight.

The aqueous coating composition of the present invention uses aqueous resin compositions having the above-described structures.

The aqueous resin composition of the present invention is a dispersion fluid containing polymer particles obtained by causing the dispersed particles in a dispersion fluid dispersively containing chlorinated polyolefin resin particle to swell by means of polymerizable monomers, and polymerizing the polymerizable monomers absorbed into the particles due to the swelling. Thus, the chlorinated polyolefin resin is obtained by swelling, not dissolving, in the polymerizable monomer, so as to allow the use of chlorinated polyolefin resins with low chlorinations having the property of not being very soluble in acrylic monomers but being highly adhesive with respect to polyolefin base materials. The aqueous coating composition using this composition has exceptional adhesion with respect to polyolefin base materials.

Additionally, the resin particles which are dispersed in the aqueous resin composition of the present invention are in microparticulate form, so that an aqueous coating composition using this offers exceptional smoothness when forming a coating film. Furthermore, each of the dispersed resin particles is a particle which is uniformly complexed by means of polymerizable monomers. Therefore, not only do they offer exceptional storage stability when formed into a coating composition, but they also form composite coating films with high uniformity so as to allow for exceptional water resistance as well as being extremely useful for improving other coating film properties.

Furthermore, the aqueous resin composition production method of the present invention is an extremely simple method wherein chlorinated polyolefin resins are not dissolved in polymerizable monomers but instead caused to swell by the polymerizable monomers. Therefore, there is no need to consider the solubility of the chlorinated polyolefin resin in polymerizable monomers, and it is possible to omit complicated dissolving processes and various steps associated therewith.

PREFERRED EMBODIMENTS OF THE INVENTION

The aqueous resin composition according to the present invention is an aqueous dispersion fluid containing resin particles (hereinafter referred to as denatured resin particles) obtained by dispersing chlorinated polyolefin resin particles which are swollen by polymerizable monomers in an aqueous medium, then polymerizing the polymerizable monomers absorbed into the chlorinated polyolefin resin particles by this swelling.

The denatured resin particles obtained in the above manner shrink in volume due to the polymerization of the polymerizable monomers absorbed into the chlorinated polyolefin resin particles, and this volume shrinkage is believed to result in a particle structure wherein the chlorinated polyolefin resin skeleton is exposed at the surface layer. Consequently, the coating films formed by the denatured resin particles having this type of particle structure have good adhesion to polyolefin resin base materials. Additionally, the state of mixture of the polymers originating from the polymerizable monomers and the chlorinated polyolefin resin particles themselves is highly uniform, so that the effects of denaturation based on the polymerizable monomers sufficiently arise and the coating films which are formed become composite coating films with exceptional coating film properties such as weather resistance and water resistance.

Specifically, the present invention employs a method wherein the chlorinated polyolefin resin particles are swollen instead of dissolved in polymerizable monomers as a method for obtaining aqueous resin compositions; thus, there are no restrictions owing to the solubility of the chlorinated polyolefin resins with respect to the polymerized monomers. Consequently, the present invention offers the advantage that it is possible to use chlorinated polyolefin resins with low chlorinations, which have good adhesion with respect to polyolefin resin base materials. This advantage offers another bonus in that it is possible to reduce the amount of the chlorinated polyolefin resin in the coating and the binder, thus allowing for economization.

Additionally, in the aqueous resin composition of the present invention, the particle sizes of the chlorinated polyolefin resin particles are not such as to make the volume of expansion larger than the volume of the polymerizable monomers absorbed into the resin particles as a result of the swelling, so that if chlorinated polyolefin resin particles with small particle sizes are used as the starting substance, the resulting denatured resin particles can be made into microparticles of a corresponding size, as a result of which the coating film surface which is formed can be made into a smooth surface which is suitable as a coating composition for top-coats.

Furthermore, since the denatured resin particles dispersed in the aqueous resin composition of the present invention all have roughly the same composition, it is possible to obtain a composition with exceptional stability as a coating composition wherein particle aggregations such as particle coagulations are not likely to occur, in contrast to those wherein two different types of emulsions are simply blended together for denaturation.

The chlorinated polyolefin resin particles used for the present invention are dispersed in an aqueous medium in microparticulate form, and should preferably be such that the particles are dispersed in the aqueous medium in solid form. Additionally, this chlorinated polyolefin resin is a component for conferring good adhesion with respect to polyolefin resins, for which it is important that the chlorination be within the range of 10–50% by weight, and more preferably within the range of 15–25% by weight. If the chlorination is less than 10% by weight, swelling due to the polymerizable monomers becomes difficult, and at greater than 50% by weight, the particles are prone to dissolve in the polymerizable monomer and the adhesion with respect to polyolefin resins is made worse.

There are no specific restrictions to the particle sizes of the chlorinated polyolefin resin particles, but they should be 150 nm or less, and preferably within the range of 50–100 nm, when considering the ease of swelling due to polymerizable monomers, smoothness of the coating film after formation of the coating and the like. If the particle size exceeds 150 nm, the smoothness of the surfaces of the resulting coating films is degraded, making it inappropriate for use as a coating for top-coats and degrading the stability for storage of the coating composition.

As examples of chlorinated polyolefin resins for forming the above-described chlorinated polyolefin resin particles, there are polymers and copolymers of α-olefins such as ethylene, propylene, 1-butene, 3-methyl-1-pentene and the like, as well as copolymers between these α-olefins and other monomers (e.g. copolymers of ethylene-vinyl acetate, ethylene-butadiene, ethylene-acrylic ester, etc.), which are chlorinated so as to have chlorinations of 10–50% by weight. As examples, there are chlorinated polyethylene, chlorinated polypropylene, chlorinated polypropylene-ethylene copolymers, chlorinated polyethylene-vinyl acetate copolymers and the like, which can be used either singly or in mixtures of two or more types.

The aqueous dispersion fluid of the chlorinated polyolefin resin particles can be produced by a method wherein the above-described chlorinated polyolefin resins are pulverized into microparticles and directly dispersed in water, a method wherein the chlorinated polyolefin resins are dissolved in water by raising the temperature and dispersed by means of high-speed agitation, or a method wherein the chlorinated polyolefin resins are dissolved in organic solvents such as toluene so as to be 10–50% by weight, mixed by agitation in water by means of a homomixer or the like in order to form an emulsion, and the organic solvent removed by means of a solvent removal process. At this time, in order to aid in dispersion, a dispersion stabilizer or an emulsifier may be present in the dispersion fluid if necessary, or hydrophilic organic solvents such as ethylene glycol monobutyl ether, dipropylene glycol monomethyl ether, or the like may be present. In this case, the organic solvents used for dispersion should preferably be removed by a suitable method (such as reduced pressure distillation), but small amounts of the dispersion solvent may be allowed to remain in the particles in non-toxic quantities.

Additionally, aside from aqueous dispersion fluids of chlorinated polyolefin resin particles produced by the above method, denatured chlorinated polyolefins wherein carboxyl groups or acid anhydrides are added to chlorinated polyolefin resins result in aqueous dispersions with excellent stability when neutralized, and these may be used as dispersion fluids as well. As an example of this type of aqueous dispersion fluid or emulsion of chlorinated polyolefin resins, there is an emulsion of an unsaturated organic acid-denatured chlorinated polypropylene which is marketed under the trade name "CP-347W" by Eastman Chemical Ltd., and these types of emulsions are suitable for use in the present invention.

As the polymerizable monomers utilized for the present invention, any type may be used without any special restrictions as long as they are capable of easily swelling chlorinated polyolefin resin particles dispersed in aqueous media. As examples, there are acrylic monomers such as n-butyl (meth)acrylate, iso-butyl(meth)acrylate, tert-butyl(meth)acrylate, 2-ethylhexyl(meth)acrylate, cyclohexyl(meth)acrylate, isobornyl(meth)acrylate, dicyclopentenyl(meth)acrylate and the like, vinyl balsatate monomers (such as "Veoba 9 and 10" manufactured by Shell Chemical Ltd.), styrene, vinyltoluene and the like, and these monomers may be used either singly or as mixtures of two or more types.

More specifically, among the polymerizable monomers given in the above examples, it is preferable to use a (meth)acrylate type monomer with at least four carbon atoms and having a hydrocarbon group prepared from an alicyclic alcohol or a monomer mixture containing at least 50% by weight of this (meth)acrylate-type monomer from the standpoint of properties such as the adhesion to polyolefin resin materials, durability of the coating film, storage stability of the coating composition, and the like. In such a monomer mixture, if the (meth)acrylate-type monomer is less than 50% by weight, then the monomer mixture is less prone to cause swelling of polypropylene resin particles having chlorinations of 25% or less which are held to have exceptional adhesion with respect to untreated polypropylene resin base materials. As a result, only aqueous compositions with considerable coarse particle generation can be obtained in the polymerization process, and the adhesion with respect to polypropylene resin base materials also becomes inadequate.

Even among acrylic monomers, those which contain acidic components such as (meth)acrylates are not desirable because they suppress the dispersion stability. Additionally, alkyl(meth)acrylate-type monomers having three carbon atoms or less such as methyl(meth)acrylate, ethyl(meth)acrylate, iso-propyl(meth)acrylate and the like, and acrylic monomers having a polar group within the molecules such as 2-hydroxyethyl (meth)acrylate, dimethylamino(meth)acrylate and the like are monomers which do not easily cause swelling of chlorinated polyolefin resin particles, so that if these monomers are to be used, they should preferably be used in suitable mixtures with monomers which are likely to cause swelling.

The above-mentioned polymerizable monomers should be used in an amount such that the proportion of chlorinated polyolefin resin particles/polymerizable monomers is within the range of 5–50% by weight/95–50% by weight, more preferably 15–30% by weight/85–70% by weight. With regard to these proportions, if there is less than 5% by weight of the chlorinated polyolefin resin particles, the adhesion to the polyolefin base materials is reduced, and at more than 50% by weight, the coating film properties such as oil resistance and weather resistance of the resulting coating films are made worse.

The aqueous resin composition of the present invention is produced by adding the above-mentioned polymerizable monomers to an aqueous dispersion fluid containing dispersed chlorinated polyolefin resin particles, then polymerizing the polymerizable monomers absorbed into the chlorinated polyolefin resin particles by means of swelling. An example of a production method is explained below.

The swelling of the chlorinated polyolefin resin particles can be done by adding the above-listed polymerizable monomers to an aqueous dispersion fluid containing these chlorinated polyolefin resin particles, and allowing the monomers to be absorbed into the chlorinated polyolefin resin particles with the passage of time. During this swelling, the polymerizable monomers should be quickly absorbed without the formation of coarse particles due to coagulation between particles, by dripping the monomers while agitating the dispersion fluid at a fluid temperature range of at least the glass transition temperature of the resin particles. When heating, the dispersion particles melt to form droplets when the temperature reaches exceeds the softening point of the chlorinated polyolefin resin, and the chlorinated polyolefin resin and polymerizable monomer become separated within these droplets; therefore, the heating conditions should be less than the softening point of the chlorinated polyolefin resins, preferably 1–5 hours at 50–80° C. If the swelling is incomplete, the denaturation of the chlorinated polyolefin resin particles due to the polymerizable monomers may occur only at the surfaces of the particles or polymer particles of only the polymerizable monomers which do not contribute to swelling may be formed, so as to worsen the coating film properties such as adhesion to the polyolefin resin or weather resistance. Thus, the swelling should be done sufficiently.

For the polymerization of the polymerizable monomers absorbed into the chlorinated polyolefin resin particles as described above, a polymerization initiator is used in order to efficiently advance the polymerization reaction. As a polymerization initiator, a water-soluble polymerization initiator such as generally used for emulsive polymerization can be used in a normal amount, since the polymerization reaction takes place in an aqueous medium. Specific examples of polymerization initiators which can be used are water-soluble polymerization initiators such as potassium persulfate, ammonium persulfate, hydrogen peroxide, 4,4'-azobis(4-cyanovaleriate), which may be used either singly or in mixtures of two or more types. Additionally, redox-type initiators may also be used, examples of which are those obtained by combining the above-mentioned water-soluble polymerization initiators with reducing agents (e.g. salts with low-order ionic valencies such as sulfite, hydrogensulfite, cobalt, iron or copper).

While the polymerization conditions cannot be simply specified due to the types of polymerizable monomers and polymerization initiators used, but the polymerization temperature should normally be 20–200° C., preferably 50–80° C., and the polymerization time is generally about 1–5 hours. In order to perform adequate polymerization, the polymerization should be continued for 1–2 hours after the exothermic peak due to polymerization. Additionally, in order to allow the polymerization to advance quickly, the atmosphere within the polymerization system should preferably be replaced with an inert gas such as nitrogen gas.

During the above polymerization reaction, a dispersant may be added to the reaction system if necessary in order to prevent the chlorinated polyolefin resin particles swollen with the polymerizable monomers from coagulating or fusing during the polymerization reaction. As examples of dispersants, there are water-soluble macromolecular compounds such as polyvinyl alcohol, polyacrylic acid salts and the like, and water-insoluble micropowdered inorganic compounds such as calcium phosphate, calcium carbonate, calcium hydroxyapatite and the like.

Additionally, while various types of surfactants can be included within the reaction system if necessary, these should preferably be added after completion of the swelling process by the monomers and immediately before commencement of the polymerization process. The types of surfactants which can be used include non-reactive surfactants and reactive surfactants. Examples of non-reactive surfactants are nonionic surfactants such as polyoxyethylene alkyl ethers, polyoxyethylene alkylphenol ethers, polyoxyethylene fatty acid esters, polyoxyethylene polyhydric alcohol fatty acid esters, polyoxyethylene propylene polyols, sorbitan alkyl esters, polyglycerin esters and the like, and anionic surfactants such as alkyl sulfuric esters, alkylphenolsulfonic acid salts, sulfosuccinic esters, abietic acid salts and the like. Examples of reactive surfactants are those which are commonly available on the market as reactive emulsifiers such as Latemul S-180A produced by Kao Corporation, Adeka Reasoap SE-19N produced by Asahi Denka Kogyo K.K., Aqualon HS-10 and RN-20 produced by Dai-ichi Kogyo Seiyaku Co., Ltd., Eleminol JS-2 produced by Sanyo Chemical Industries Ltd., and the like. These surfactants can be used either singly or in mixtures of two or more types, and their amount should be 0.1–5 parts by weight, preferably 0.2–3 parts by weight with respect to 100 parts by weight of the polymerizable monomers.

While the denatured resin particles contained in the aqueous resin composition of the present invention are produced by the steps of swelling the chlorinated polyolefin resin particles by means of the polymerizable monomers, then polymerizing the polymerizable monomers as explained above, they may also be produced by two-stage swelling by re-swelling the resulting denatured resin particles with the polymerizable monomers and subsequently polymerizing. This type of two-stage swelling method is advantageous in cases wherein the proportional amount of the polymerizable monomers is large compared to that of the chlorinated polyolefin particles or wherein the polymerization is highly exothermic because the generated heat can be dispersed, and is also advantageous due to the ability to suppress formation of polymer particles of only the polymerizable monomers. Furthermore, different polymerizable monomers can be used for the first-stage swelling and the second-stage swelling, so that a variety of types of denaturation can be conducted with respect to the chlorinated polyolefin resins.

The aqueous resin composition for coatings according to the present invention can be used in its original form as a clear varnish. On the other hand, various modifications can be made by mixing in various types of additives which are commonly used in the field of coatings as well as other resin emulsions, within a range such as not to inhibit the adhesion with respect to polyolefin base materials for the purposes of further improving the coating film performance, such as the film formability, coating film hardness, weather resistance, flexibility and the like. Specific examples include organic or inorganic colorants and pigments such as titanium oxide and phthalocyanine blue, brightening materials such as aluminum paste, cellosolves, film formation aids such as dipropylene glycol monobutyl ether, defoaming agents, anti-dripping agents and UV-absorbents. The use of acrylic resin emulsions is especially preferable in order to improve the performance of the coating film such as the weather resistance, water resistance, coating film hardness and flexibility.

Furthermore, it is possible to add tackifiers which are commonly used in the field of pressure-sensitive adhesives to the aqueous resin composition for coatings according to the present invention, in order to improve the dryness of the coating film or the adhesion with respect to polyolefin resins. Examples of these are aqueous dispersion fluids of rosin, dammar, polymerized rosin, hydrogenated rosin, ester rosin, rosin-denatured maleic acid resin, polyterpene resins, petroleum resins, cyclopentadiene resins, phenol resins, xylene resins and coumarone-indene resins. The amount added should preferably be 5–100 parts by weight, preferably 10–50 parts by weight with respect to 100 parts by weight of the solid component of the resin composition.

The formation of the coating using the aqueous resin composition for coatings of the present invention can be done by means of a conventional method. As an example, the coating can be formed by adding the various above-mentioned additives (colorants or pigments, film formation aids, defoaming agent, anti-dripping agents, UV-absorbents, etc.), other resin emulsions, tackifiers, water and the like to the aqueous resin composition of the present invention as needed, and blending uniformly.

The coatings obtained as described above are appropriate for use on various polyolefin resin base materials such as polypropylene resins, but are not restricted to use on these types of base materials, and can be coated onto other types of plastics, lumber, metals and the like. There are no particular restrictions to the coating method, and various types of conventional methods may be used, including brushing, spraying, immersion and the like. After coating, the coating film can be dried at room temperature, but should preferably be dried at 30–120° C., more preferably 60–90° C. However, the drying temperature when the base material of application is plastic should not be greater than the thermal resistance temperature of the base material. For example, if the base material of application is a polypropylene resin, it is possible to form a coating film with exceptional adhesion under drying conditions of 85° C. or less, preferably of 80° C. for 30 minutes.

EXAMPLES

Next, the present invention will be explained in detail by way of examples, but the following are merely examples which do not restrict the present invention. The amounts of the components in the following examples are indicated in parts by weight as long as they are not specified as being otherwise.

Example 1
Production Example for Aqueous Resin Composition (a)

350 g of a chlorinated polyolefin resin emulsion (Eastman Chemical Ltd., CP-347W; chlorination 20% and resin solid component 20%) and 410 g of distilled water were put into a 1-liter flask equipped with a cooler, a thermometer, a stirrer and a polymerizable monomer dripping device, after which the interior of the flask was replaced with nitrogen gas. Next, while maintaining the temperature of the contents of the flask at 65° C. and stirring, a monomer mixture consisting of 95 g of isobutylmethacrylate (hereinafter referred to as i-BMA), 52 g of cyclohexylmethacrylate (hereinafter referred to as CHMA), 42 g of cyclohexylacrylate (hereinafter referred to as CHA) and 21 g of styrene was dripped over a period of one hour, after which the stirring was continued for one more hour at the same temperature to cause swelling of the chlorinated polypropylene resin particles.

To the aqueous dispersion fluid in the flask as obtained above, 30 g of an aqueous solution containing 5 g of a reactive emulsifier (Kao Corporation, Latemul S-180A) and 1 g of a polymerization initiator (ammonium persulfate) were added, and the polymerization of the monomer mixture was initiated by raising the temperature in the flask to 77° C. The polymerization reaction was sustained at the same temperature for 60 minutes after the exothermic activity due to the reaction ended, then further sustained for 1.5 hours at 90° C., after which the result was cooled to obtain an aqueous resin composition (a). The resin concentration (solid component) of the resulting composition was 28% by weight, and the ratio of chlorinated polyolefin resin/polymerizable monomer (hereinafter referred to as the Cl-PP/monomer ratio) in the denatured resin particles was 25 parts/75 parts.

Preparation of Coating Composition

A mixed fluid of 11.8 parts ion-exchange water, 1.5 parts tackifier (a mixture of 3 parts water, 2 parts SN thickener 613 and 1 part SN thickener 612 which are produced by San Nopco Ltd.) and 6.7 parts film forming agent (Dow Chemical Ltd., Dawanol DPnB) was stirred by a high-speed dissolver, while adding 80 parts (22.4 parts of the resin solid component) of the aqueous resin composition obtained above and providing adequate mixture, then 0.1 parts of a defoaming agent (Kyoeisha Chemical Co., Ltd., Aqualen 825) were added to form a coating composition.

Evaluation of Coating Composition

After adjusting the viscosity of the coating composition obtained as above to be 30–35 seconds in a No. 4 ford cup, the coating composition was sprayed onto a 3 mm thick non-surface-treated polypropylene resin plate (Ube Industries Ltd., UBE-J-109G) so as to form a 20–25 μm thick dry coating film. After drying at 80° C. for 30 minutes, then leaving for 48 hours in a 20° C.×60% RH atmosphere, it was formed into a test plate and the coating film was tested by the following testing methods. The results are shown in Table 2.

(1) Adhesion: Slices were made in the coating film on the test board such as to pass completely through the coating film and reach the board surface, such as to make 100 cells spaced by 1 mm intervals. Then, cellophane adhesive tape was applied over these cells, then peeled away in a 180 degree direction, after which the state of adhesion to the coating film was evaluated by eye. The standards of evaluation were as follows:

○: Absolutely no peeling, all 100 cells still remain.

Δ: 51–99 cells still remain.

X: 50 cells or less remain.

(2) Water Resistance: After immersing the test board in hot water of 40° C. for 240 hours, then conditioning for one hour at 20° C., the adhesion was evaluated according to the same method and standards as in case (1) above.

(3) Storage Stability: 80 g of the coating composition having an adjusted viscosity as above was sealed into a container having a capacity of 100 cc, then left for one week in a 50° C. atmosphere, after which the viscosity change was evaluated according to the following standards:

○: Slight viscosity increase (viscosity of 40 sec or less).
Δ: Viscosity increase (viscosity of 40 sec or more).
X: No fluidity.

(Examples 2 and 3 and Comparative Examples 1 and 2)

Production Examples for Aqueous Resin Compositions (b)–(e)

Aqueous resin compositions (b)–(e) were produced by a method absolutely identical to Example 1, with the exception that the components used in the production example for the aqueous resin composition (a) of Example 1 were replaced with the compositions indicated in Table 1 below. The Cl-PP/monomer ratios of each of the aqueous resin compositions which were obtained are shown in Table 1.

TABLE 1

| Aqueous Resin Composition | | (b) | (c) | (d) | (e) |
|---|---|---|---|---|---|
| Composition of Resin | CP-347 | 210.0 | 70.0 | 42.0 | 840.0 |
| | i-BMA | 107.1 | 119.7 | 122.2 | 50.4 |
| | CHMA | 59.5 | 66.5 | 67.9 | 28.0 |
| | CHA | 47.6 | 53.2 | 54.3 | 22.4 |
| | Styrene | 23.8 | 26.6 | 27.2 | 11.2 |
| Aqueous Phase | Distilled Water | 552.0 | 664.0 | 686.4 | 48.0 |
| | Polymerization Initiator | 1.0 | 1.0 | 1.0 | 1.0 |
| | Reactive Emulsifier | 5.0 | 5.0 | 5.0 | 5.0 |
| Cl-PP/monomer Ratio (parts by weight) | | 15/85 | 5/95 | 3/97 | 60/40 |

Preparation and Evaluation of Coating Composition

Using the respective aqueous resin compositions obtained above, coating compositions were prepared in exactly the same manner as with the preparation of the coating composition in Example 1 (Example 2 used aqueous resin composition (b), Example 3 uses aqueous resin composition (c), Comparative Example 1 uses 10 aqueous resin composition (d) and Comparative Example 2 uses aqueous resin composition (e)), then these were evaluated in the same manner as the evaluation method for the coating composition in Example 1, and the results of the evaluations are shown in Table 2.

(Comparative Example 3)

Production Example for Acrylic Resin Emulsion 693.3 g of distilled water, 1.3 g of ammonium persulfate (polymerization initiator) and 7.3 g of reactive emulsifier (Kao Corporation, Latemul S-180A) were put into a 1-liter flask as with Example 1, a monomer mixture consisting of 138 g of i-BMA, 76.7 g of CHMA, 61.3 g of CHA and 30.7 g of styrene was added while stirring, and the polymerization of the monomer mixture was initiated by raising the interior temperature of the flask to 77° C. The polymerization reaction was sustained at the same temperature for 60 minutes after the exothermic activity due to the reaction ended, then further sustained for 1.5 hours at 90° C., after which the result was cooled to obtain an acrylic resin emulsion.

Preparation and Evaluation of Coating Composition 655.6 parts of the acrylic resin emulsion obtained above and 350 parts of the chlorinated polyolefin resin emulsion used in Example 1 were well-mixed to form an aqueous resin composition (f) consisting of a simple blend of the acrylic resin emulsion and the chlorinated polyolefin resin emulsion. With the aqueous resin composition obtained above, coating compositions were prepared in exactly the same manner as with Example 1, then these were evaluated. The results are shown in Table 2.

(Comparative Example 4)

Production Example for Aqueous Resin Composition (g)

212.9 g of i-BMA, 118.2 g of CHMA, 94.6 g of CHA, 47.3 g of styrene, 220 g of an oligomer (Toa Gosei Co., Ltd., AW-6S; 50% toluene solution) and 400 g of a chlorinated polypropylene resin (Eastman Chemical Ltd., CP343-3; chlorination 30% by weight, 50% xylene solution) were added to a 2-liter capacity four-necked flask equipped with a stirrer, and the result was mixed and dissolved at 80° C. so as to be uniform overall. Then, the toluene and xylene contained therein was distilled away under reduced pressure, and the result was cooled to room temperature, after which 17 g of methacrylic acid were added, then 11 g of polymerization initiator (NOF Corporation, Nyper BO) and 0.7 g of t-dodecylmercaptan were further added to obtain a uniform monomer solution (A). Separately, 54 g of polyvinyl alcohol (Kuraray Co., Ltd., Poval 217 ZZ), 8 g of hydroxypropyl cellulose (Nippon Soda Co., Ltd., HPC-SL), 15 g of anionic surfactant (Dai-ichi Kogyo Seiyaku Co., Ltd., Neocol-P) and 33 g of nonionic surfactant (Dai-ichi Kogyo Seiyaku Co., Ltd., Noigen EA-190) were added to 1300 g of distilled water, which was uniformly mixed to obtain an aqueous solution (B). After putting the monomer solution (A) and the aqueous solution (B) into an appropriate container and dispersing uniformly for 30 minutes using a homogenizer (at 2,000 rpm), the result was filtered with a #400SUS type metallic mesh to form a pr-eemulsion.

After putting 200 g of distilled water into a 2-liter capacity four-necked flask equipped with a dripping device and replacing the interior of the flask with nitrogen, the interior temperature of the flask was raised to 63° C., and the pre-emulsion obtained above was dripped over 3 hours while stirring, after completion of which the result was matured at 63° C. for 7 hours. The resulting emulsion was filtered with a #400SUS type metallic mesh to form an aqueous resin composition (g) (having a resin solid component of 37.5% by weight).

Preparation and Evaluation of Coating Composition

After diluting the above aqueous resin composition (g) with distilled water so as to make the resin solid component 22.4% by weight, a coating composition was prepared by exactly the same method as was used to prepare the coating composition of Example 1, then the coating composition was evaluated using the same evaluation method as with the coating composition of Example 1. The results are shown in Table 2.

TABLE 2

| | Aqueous Resin Composition | Coating Composition Evaluation Category | | |
|---|---|---|---|---|
| | | Adhesion | Water Resistance | Storage Stability |
| Example 1 | (a) | ○ | ○ | ○ |
| Example 2 | (b) | ○ | ○ | ○ |
| Example 3 | (c) | ○ | ○ | ○ |
| Comparative Example 1 | (d) | Δ | x | Δ |
| Comparative Example 2 | (e) | ○ | Δ | x |
| Comparative Example 3 | (f) | x | x | x |
| Comparative Example 4 | (g) | x | x | Δ |

As is clear from the results shown in Table 2, the aqueous coating composition using the aqueous resin composition according to the present invention exhibits good adhesion with respect to non-surface-treated polypropylene base materials and also has exceptional properties with regard to water resistance and storage stability, as can be seen by the evaluation results for Examples 1–3. In contrast, the coating compositions of Comparative Examples 1 and 2 using aqueous resin compositions (d) and (e) having chlorinated polypropylene resin/polymerizable monomer ratios which lie outside the range of the present invention are especially poor with respect to water resistance and storage stability. The coating composition of Comparative Example 3 which is a simple blend of a chlorinated polypropylene resin emulsion and an acrylic resin emulsion not only has poor adhesion to polypropylene base materials but also has poor water resistance and storage stability. The coating composition of Comparative Example 4 which uses a conventional aqueous resin composition (g) obtained by dissolving a chlorinated polypropylene resin in an acrylic monomer and emulsion polymerizing does not allow for very good adhesion to untreated polypropylene base materials, has poor water resistance, and does not have sufficient storage stability as a coating composition to allow for practical application.

I claim:

1. An aqueous resin composition comprising resin particles obtained by causing chlorinated polyolefin resin particles dispersed in an aqueous dispersion fluid with a chlorination of 10–50% by weight to swell by means of polymerizable monomers, then polymerizing the polymerizable monomers; wherein the ratio of said chlorinated polyolefin resin particles to said polymerizable monomers is 5–50% by weight to 95–50% by weight.

2. An aqueous resin composition in accordance with claim 1, wherein the chlorination of said chlorinated polyolefin resin particles is 15–25% by weight.

3. An aqueous resin composition in accordance with claim 1, wherein the particle size of said chlorinated polyolefin resin is not more than 150 nm.

4. An aqueous resin composition in accordance with claim 1, wherein said polymerizable monomer contains at least 50% by weight of a (meth)acrylate monomer having at least four carbon atoms and having a hydrocarbon group prepared from an alicyclic alcohol.

5. A method for producing an aqueous resin composition, comprising:
   a swelling step wherein chlorinated polyolefin resin particles are caused to swell with polymerizable monomers by adding polymerizable monomers capable of causing said chlorinated polyolefin resins to swell to an aqueous dispersion fluid containing dispersed chlorinated polyolefin resin particles with a chlorination of 10–50% by weight, such that the ratio of said chlorinated polyolefin resin particles to said polymerizable monomers is 5–50% by weight to 95–50% by weight; and
   a polymerizing step wherein the polymerizable monomers absorbed into said chlorinated polyolefin resin particles are polymerized.

6. A method for producing an aqueous resin composition in accordance with claim 5, wherein the chlorination of said chlorinated polyolefin resin particles is 15–25% by weight.

7. A method for producing an aqueous resin composition in accordance with claim 5, wherein the particle size of said chlorinated polyolefin resin is not more than 150 nm.

8. A method for producing an aqueous resin composition in accordance with claim 5, wherein said polymerizable monomer contains at least 50% by weight of a (meth)acrylate monomer having at least four carbon atoms and having a hydrocarbon group prepared from an alicyclic alcohol.

9. A method for producing an aqueous resin composition in accordance with claim 5, wherein said swelling step is conducted at a temperature of 50–80° C. over a period of 1–5 hours.

10. An aqueous coating composition containing the aqueous resin composition recited in claim 1.

11. An aqueous resin composition in accordance with claim 1, wherein said polymerizable monomer is a vinyl monomer.

* * * * *